L. HOTCHKISS.
FRUIT PICKER.
No. 79,906. Patented July 14, 1868.
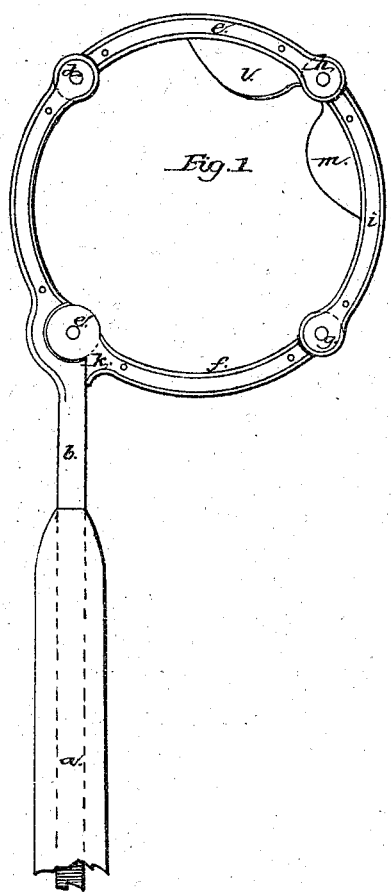
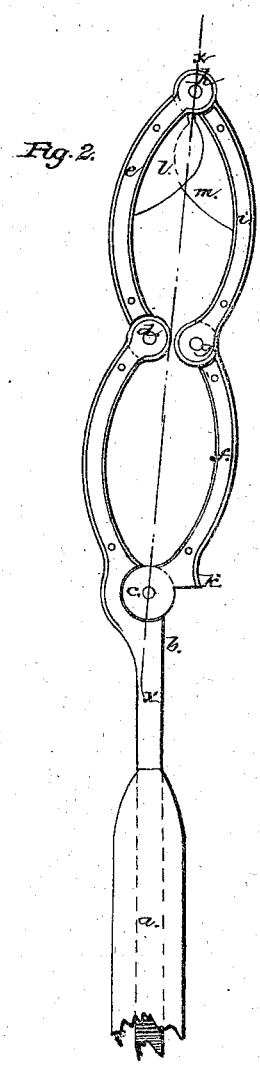
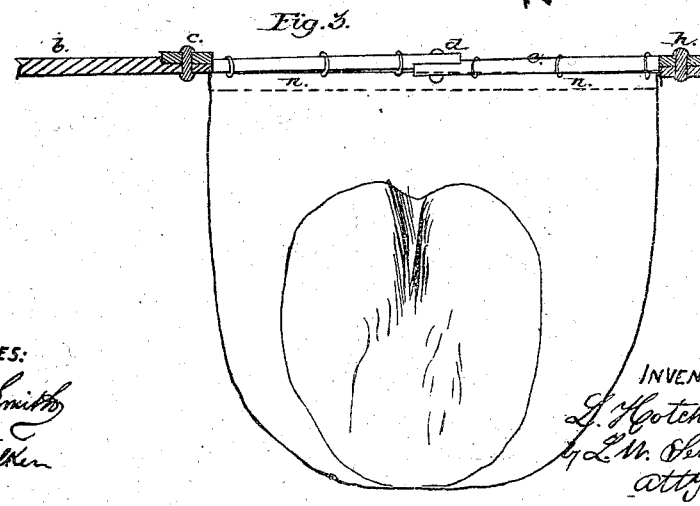
WITNESSES:
Chas. H. Smith
Geo. D. Walker
INVENTOR:
L. Hotchkiss
by L. W. Serrell
atty.

United States Patent Office.

LEANDER HOTCHKISS, OF TORRINGTON, ASSIGNOR TO ELISHA TURNER, OF WOLCOTTVILLE, CONNECTICUT.

Letters Patent No. 79,906, dated July 14, 1868.

IMPROVEMENT IN FRUIT-PICKERS.

The Schedule referred to in these Letters Patent and making part of the same.

TO ALL WHOM IT MAY CONCERN:

Be it known that I, LEANDER HOTCHKISS, of Torrington, in the county of Litchfield, and State of Connecticut, have invented, made, and applied to use a certain new and useful Improvement in Fruit-Pickers; and I do hereby declare the following to be a full, clear, and exact description of the same, reference being had to the annexed drawing, making part of this specification, wherein—

Figure 1 is a plan of the fruit-picker open and ready to be placed over the fruit.

Figure 2 is a similar view of the same, as closed upon the fruit; and

Figure 3 is a section at the line $x$ $x$ of fig. 2.

Similar marks of reference denote the same parts.

Fruit-pickers have heretofore been made that operate by a pull of a wire or cord. These require the use of both hands, in situations where it is often necessary to use one hand for holding on to the tree; hence such pickers are not convenient.

The nature of my said invention consists in a fruit-gatherer or picker formed of a jointed segmental ring, that closes upon the fruit in the act of drawing or moving the same, to pull or cut off the fruit, thereby allowing the fruit-picker to be operated by one hand.

In the drawing, $a$ represents a portion of a pole or handle for the picker. $b$ is the tang or spike of the picker passing into the pole. $c$ and $d$ are joints formed with the tang $b$, and receiving the segments $e$ and $f$, which are jointed at $g$ and $h$ to the segment $i$.

These segments fall naturally into the position shown in fig. 1, the shoulder $k$, at the joint $c$, forming a stop. In this condition the ring is passed up around the fruit, and the act of pulling upon the pole $a$ causes the segments to close together, as seen in fig. 2, and hold the fruit so that it will be pulled off at the stem. I prefer and use cutters or knives, as at $l$ $m$, to cut the stems, but these might be dispensed with.

The segments forming the ring might be made nearly straight, so as to close nearer together if desired.

The fruit might be allowed to fall, but I prefer and use a bag or canvas tube, attached to the gatherer at its upper end, as shown at $n$.

What I claim and desire to secure by Letters Patent, is—

A fruit-gatherer formed of a jointed segmental ring, that closes upon the fruit in the act of pulling or cutting the same off, substantially as set forth.

In witness whereof, I have hereunto set my signature, this eleventh day of May, 1868.

LEANDER HOTCHKISS.

Witnesses:
H. S. BARBOUR,
E. T. COE.